Oct. 15, 1974  A. L. McGEE  3,841,997
DUAL AERATION AND FILTRATION SYSTEM WITH RECYCLING
Filed April 2, 1973  2 Sheets-Sheet 2

United States Patent Office 3,841,997
Patented Oct. 15, 1974

3,841,997
DUAL AERATION AND FILTRATION SYSTEM WITH RECYCLING
Albert L. McGee, Rio Vista Road,
Pocatello, Idaho 82301
Filed Apr. 2, 1973, Ser. No. 346,817
Int. Cl. C02c 1/12
U.S. Cl. 210—15                                   5 Claims

ABSTRACT OF THE DISCLOSURE

A sewage or industrial waste is treated by alternately aerating and filtering it in an enclosure partitioned into a plurality of treating compartments. Aerating diffusers connected to a common conduit forming a manifold double as filters permitting the waste to pass through the conduit from one treatment compartment to another when aerating fluid under pressure is removed from the conduit and diffusers.

BACKGROUND OF THE INVENTION

Field of the Invention

This invention relates to a method for treating fluids, particularly for treating sewage and industrial waste, and to apparatus for performing the method.

Description of the Prior Art

It has long been known to pass a fluid, such as air, through sewage, and the like, and aerate it for improving aerobic purifying action in the waste. This is generally referred to as the activated sludge process for causing breakdown of pollutants. A typical approach is to combine aeration and filtration in sequential operations by passing the waste through chambered, staged, or sectioned compartments. An example of prior art aeration and filtration process devices may be seen in U.S. Pats. Nos. 1,189,114, 3,265,370, and 3,503,876.

SUMMARY OF THE INVENTION

It is an object of the present invention to provide a method and apparatus for alternatively aerating and filtering a fluid.

It is another object of the present invention to provide a method and apparatus for transporting fluid from one treating compartment to another during a filtering operation.

It is yet another object of the present invention to provide a method and apparatus for the activated sludge breakdown of pollutants in a fluid which is more efficient and obtains better results than known methods and apparatuses utilizing the activated sludge process.

These and other objects are achieved according to the present invention by providing diffusers arranged on a common conduit forming a manifold permitting alternate aeration and filtration of a fluid held in an enclosure in which the diffusers and conduit are arranged, and the transport of the fluid from one compartment of the enclosure to another during the filtering operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
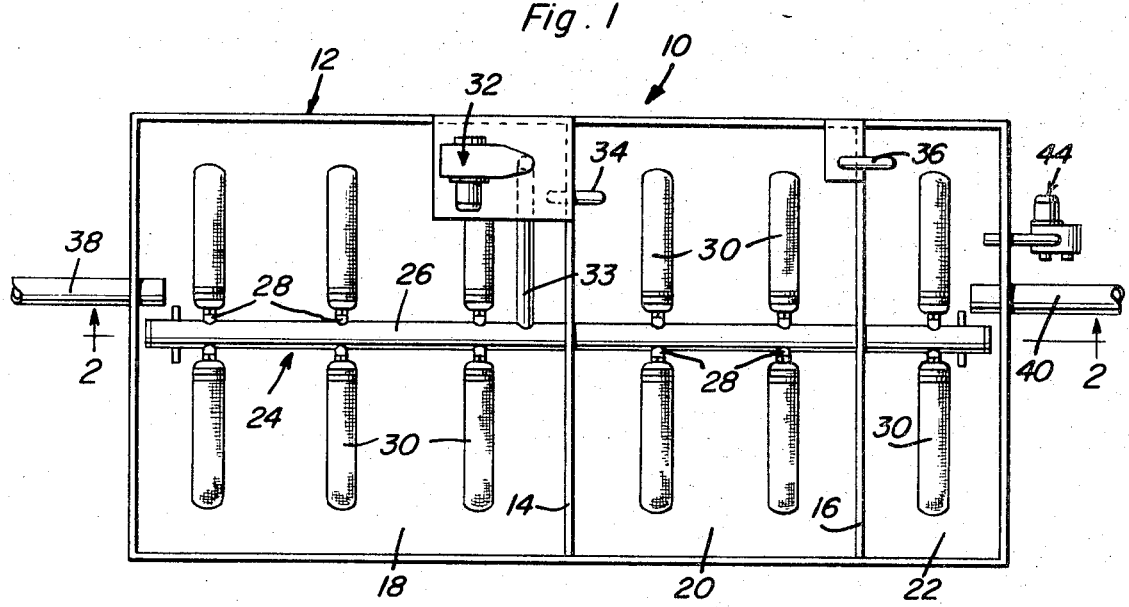
FIG. 1 is a fragmentary, schematic, top plan view showing fluid treatment apparatus according to the present invention.
Figure 2:
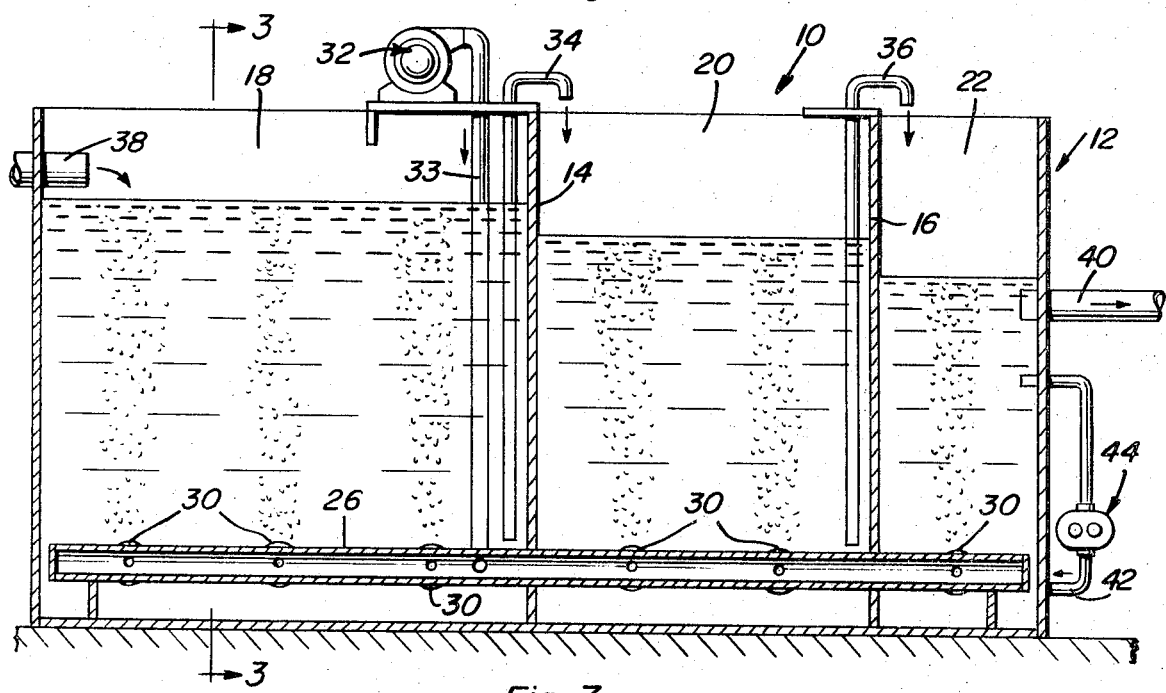
FIG. 2 is a fragmentary, schematic, sectional view taken generally along the line 2—2 of FIG. 1.

FIGS. 1 and 2 disclose a dual aeration and filtration system 10 according to the present invention. This system is formed by an enclosure 12 provided with partitions 14 and 16 forming a plurality of compartments 18, 20 and 22. Each compartment of enclosure 12 is arranged for holding a fluid to be treated. An aerating and filtering arrangement 24 is disposed in enclosure 12 for alternately aerating and filtering the fluid in the compartments.

Arrangement 24 includes a conduit 26 arranged extending between compartments 18, 20 and 22. Fittings 28 are connected to conduit 26 and are arranged extending perpendicularly from it to receive diffusers 30. The latter are arranged for passing an aerating fluid, such as air, into the sewage, and the like, to be treated, and for filtering that fluid into and out of conduit 26. A blower 32, which may be any suitable, known blower, is connected to conduit 26 as by a pipe 33 for intermittingly feeding aerating fluid under pressure into the conduit.

Conventional air lifts 34 and 36 are arranged in compartments 18 and 20, respectively, for transferring fluid from those compartments into a subsequent compartment. The waste is fed into compartment 18 as by an intake pipe 38, and an outlet pipe 40 removes purified fluid from compartment 22. Sewage or industrial waste, or the like, enters compartment 18 through intake 38 and is aerated a predetermined length of time for primary treatment. Air lift 34 transfers the fluid to compartment 20 whenever blower 32 is operating. This transfer is carried out at a predetermined rate and exposes the fluid to further treatment by aeration. Sludge is intended to be totally consumed in compartment 20. If further polishing is required, compartment 22 is utilized for raising the dissolved oxygen (DO). Transfer from compartment 20 to compartment 22 is achieved either by air lift pump 36 or conduit 26. The fluid or water can then be either recycled from compartment 22 to primary compartment 18, or can be taken from compartment 22 and used for field disposal, irrigation, or flushing water. If recycled, it will pass through a return line 42 provided with a conventional pump 44 and return to compartment 18 at a suitable point (not shown).

Figure 3:
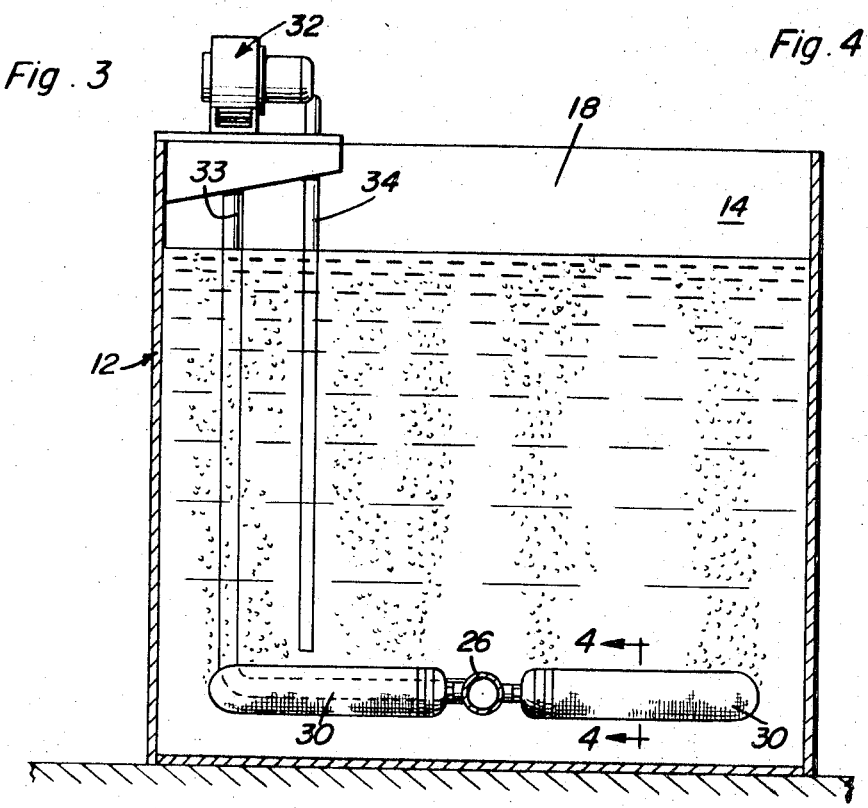
FIG. 3 is a fragmentary, schematic, sectional view taken generally along the line 3—3 of FIG. 2.
Figure 4:
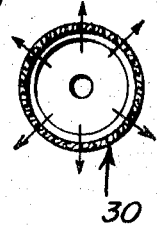
FIG. 4 is a schematic, sectional view taken generally along the line 4—4 of FIG. 3, and showing in detail a diffuser during one step in an operating cycle according to the present invention.
Figure 5:
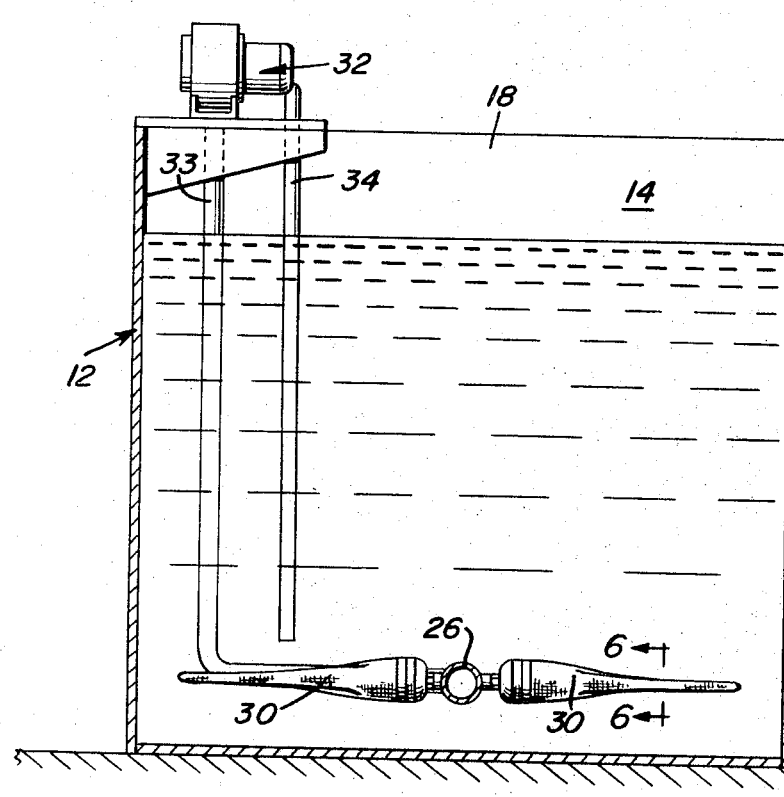
FIG. 5 is a fragmentary, schematic, sectional view similar to FIG. 3, but showing a different stage in an operating cycle according to the present invention.
Figure 6:
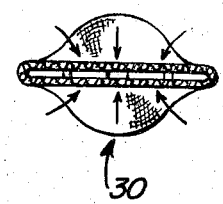
FIG. 6 is a schematic, sectional view taken generally along the line 6—6 of FIG. 5.

Referring now to FIGS. 3 and 4 of the drawings, low pressure air, and the like, from blower 32 is passed through pipe 33 to conduit 26, which serves as a common manifold for diffusers 30, and activates the diffusers. This step in a purification cycle according to the present invention aerates the fluid in the compartments and purifies it in a known manner. FIGS. 5 and 6 of the drawings show the alternate operating step or stage of the operating cycle where blower 32 has been shut down either manually, remotely, or by conventional timers (not shown) to permit the diffusers 30 to collapse and allow the fluid to filter through diffusers 30 into the manifold formed by conduit 26 and out, through the diffusers 30 in a succeeding compartment where it is re-aerated, again at a predetermined rate, for recycling or ultimate disposal.

Figure 7:
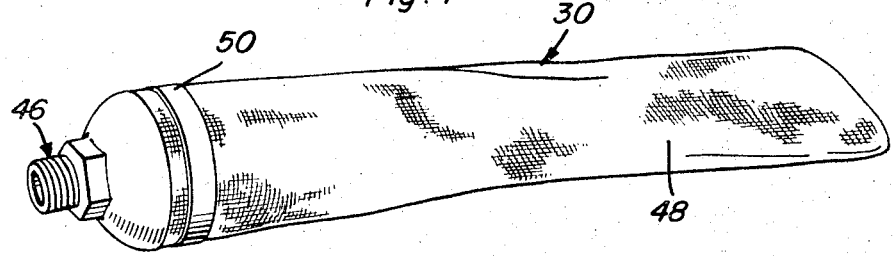
FIG. 7 is a perspective view, partly cut away and in section, showing a diffuser suitable for use with the method and apparatus of the present invention.

FIG. 7 of the drawings show a diffuser 30 specially suited for use with the method and apparatus according to the present invention. This diffuser has a male fitting 46 intended to be mounted on fittings 28. A bag 48, constructed from polyethylene, and the like, is clamped to fitting 46 as by a conventionally locked strap 50. Such a diffuser is manufactured and marketed by my company, McGee Manufacturing Co., of Pocatello, Idaho.

It may also be desirable to recycle the effluent in situations where water is unavailable or in short supply. This recycling will additionally purify the product and permit it to be applied to a wider range of uses.

Times involved in the process of treatment are correlated to such parameters as system loading, strength of pollution, volume of flow, and the reduction of the biochemical oxygen demand (BOD) as authorized by standards set out by the Environmental Protection Agency (EPA). Extended areration-aerobic digestion according to the present invention will consume excess activated sludge, if encountered, without the need for settling basins, pump-out disposal concept. A clear low coliform count effluent is possible with no disinfection being employed. Further, the method and apparatus according to the present invention makes possible a low horsepower operation with resulting cost savings.

Tests conducted over 60 days using the method and apparatus of the present invention in actual practice gave results of:

(1) Relative stability tests holding color for 60 days.

(2) Imhoff Cone tests of the primary tank or compartment 18 contents yielded 10 milliliters of settleable solids after 26 days, with absolutely no odor, clear supernatant, and 20 milliliters of evaporation. These results were taken from recycled raw sewage (BOD 255 parts per million), recycled with no other liquid than 30 gallons loss due to evaporation.

(3) Present dissolved oxygen in effluent is about 8.9 p.p.m. and varies 7.6 to 10.2 p.p.m.

(4) Six goldfish and 24 rainbow trout of the highest mortality rate size were swimming in secondary plant effluent for two months and three weeks, respectively, with the pH remaining constant at 7.0.

(5) Most probable numbers (MPN) of 8400 and 9200, the latter with water recycled through the aquarium, in the Idaho State Department of Health coliform tests.

(6) Almost total immediate reduction in the chemical oxygen demand (COD) tests.

(7) Daphnia, or aquatic animals, are present in large numbers in the primary liquid as shown by microscope observation.

Results similar to those found for effluent from a system according to the present invention are similar to those usually found in well aerated pond water, and are seldom found in activated sludge liquid in any great quantities. Further, it is extraordinary to obtain results in the cone tests of activated sludge being buffered to hold fresh and non-odorous for any length of time approaching three to four days. These tests show three weeks and longer detention for effluent from the present system. It is to be understood that the results mentioned above for a system according to the present invention may be approved even more as by the introduction of pure oxygen as an additive.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method for treating fluid waste, comprising the steps of:
   (a) introducing fluid waste into a first of a plurality of separate chambers, transferring said fluid from the first chamber to a subsequent chamber and establishing in said subsequent chamber a fluid level lower than the fluid level in the first chamber;
   (b) aerating fluid waste in the chambers by intermittingly passing an aerating fluid through interconnected diffusers arranged in the lower portion of chambers, the diffusers in the chambers being interconnected by a conduit extending between the chambers at a lower portion thereof;
   (c) filtering the waste alternately with the aerating step (b) by passing fluid in the chambers through the diffusers and into a subsequent one of the chambers whenever passage of the aerating fluid into the chambers is interrupted, the passing of the fluid between the chambers being caused by the difference in the level of the fluid in the chambers; and
   (d) discharging treated fluid from the last one of said plurality of chambers.

2. A method as defined in claim 1, wherein the filtering step further includes the step of passing the fluid through a conduit connected to the diffuser and out into a compartment other than a compartment in which the diffuser is arranged.

3. A method as defined in claim 1, wherein the filtering step includes the step of passing the fluid through a plurality of diffusers, a conduit common to the diffusers, and out a plurality of further diffusers arranged in at least one compartment other than a compartment in which the diffusers are arranged.

4. A dual aeration and filteration system, comprising, in combination:
   (a) an enclosure arranged for holding fluid to be treated, the enclosure being provided with partitions forming a plurality of separate fluid-containing compartments;
   (b) a conduit arranged extending between the compartments adjacent the bottom thereof;
   (c) blower means connected to the conduit for intermittingly feeding aerating fluid under pressure into the conduit;
   (d) means for feeding waste into the first compartment and means for transferring the waste from said first compartment to at least one subsequent compartment and establishing in said subsequent compartment a fluid level lower than the fluid level in said first compartment;
   (e) a plurality of diffusers arranged at least one to each of the compartments, the diffusers connected to the conduit and arranged in communication with the conduit and with one another for filtering fluid to the subsequent compartment whenever the feeding of fluid by the blower means is interrupted;
   (f) means for discharging treated fluid from the last one of said plurality of compartments.

5. A structure as defined in claim 4, further including fittings connected to and extending perpendicularly from the conduit, and the diffusers mounted on the fittings, and arranged for passing aerating fluid into the fluid and filtering fluid into and out of the conduit.

References Cited

UNITED STATES PATENTS

| | | | |
|---|---|---|---|
| 3,770,624 | 11/1973 | McKibben et al. | 210—221 |
| 3,682,314 | 8/1972 | Blatter | 210—221 |
| 653,160 | 7/1900 | Williamson | 210—274 |
| 1,455,505 | 5/1923 | Paterson | 210—274 |
| 2,718,275 | 9/1955 | Banks | 261—122 |
| 961,180 | 6/1910 | Utley | 210—274 |
| 3,315,895 | 4/1967 | Klingbeil et al. | 261—122 |

SAMIH N. ZAHARNA, Primary Examiner

P. A. HRUSKOCI, Assistant Examiner

U.S. Cl. X.R.

210—220; 261—122